United States Patent
Buhl et al.

(10) Patent No.: US 8,434,581 B2
(45) Date of Patent: May 7, 2013

(54) SUSPENSION DEVICE HAVING ANTI-ROLL COMPENSATION

(75) Inventors: Manfred Buhl, Bissendorf (DE); Matthias Quaing, Bad Essen (DE); Friedhelm Langhorst, Deipholz (DE); Karl Lorenz, Grosskoschen (DE); Kerstin Lahmann, Bohmte (DE); Jens Eismann, Melle (DE)

(73) Assignee: ZF Friedrichshafen AG, Friedrichshafen (DE)

(*) Notice: Subject to any disclaimer, the term of this patent is extended or adjusted under 35 U.S.C. 154(b) by 33 days.

(21) Appl. No.: 13/140,646

(22) PCT Filed: Dec. 17, 2009

(86) PCT No.: PCT/DE2009/050074
§ 371 (c)(1),
(2), (4) Date: Jun. 17, 2011

(87) PCT Pub. No.: WO2010/069305
PCT Pub. Date: Jun. 24, 2010

(65) Prior Publication Data
US 2011/0248464 A1    Oct. 13, 2011

(30) Foreign Application Priority Data
Dec. 19, 2008 (DE) .......................... 10 2008 063 812

(51) Int. Cl.
*B62D 33/06* (2006.01)
*B62D 33/10* (2006.01)
*B60G 17/016* (2006.01)

(52) U.S. Cl.
USPC .............. 180/89.12; 280/124.106; 280/5.508; 296/190.07; 180/89.15

(58) Field of Classification Search ............... 180/89.12, 180/89.13, 89.15; 280/5.508, 5.509, 124.106, 280/124.107, 124.111, 124.116; 296/190.04, 296/190.05, 190.07
See application file for complete search history.

(56) References Cited

U.S. PATENT DOCUMENTS

| | | | |
|---|---|---|---|
| 5,054,575 A * | 10/1991 | Collins | 180/354 |
| 5,310,212 A | 5/1994 | Uno et al. | |
| 5,553,911 A * | 9/1996 | Bodin et al. | 296/190.07 |
| 5,623,410 A * | 4/1997 | Furihata et al. | 701/37 |
| 6,000,703 A * | 12/1999 | Schubert et al. | 280/5.518 |
| 6,142,494 A * | 11/2000 | Higuchi | 280/93.51 |

(Continued)

FOREIGN PATENT DOCUMENTS

| | | |
|---|---|---|
| DE | 40 15 974 A1 | 12/1990 |
| DE | 42 10 132 A1 | 10/1992 |

(Continued)

*Primary Examiner* — Joseph Rocca
(74) *Attorney, Agent, or Firm* — Davis & Bujold, PLLC (57) ABSTRACT

A suspension device for suspending a mass relative to a substructure. The suspension device comprises a spring/damper arrangement which is disposed between the mass and the substructure and dampens vibrations, and comprises at least one Watt's linkage. At least one of the pivot points of the Watt's linkage is movably connected to the mass and the substructure. The relative position between the pivot point, the mass and the substructure can be adjusted by at least one substantially linearly acting actuator. The suspension device is robust and suitable for determining the vertical degree of freedom of movement of a truck driver's cab, and for damping or preventing undesired movement of the driver's cab. At the same time, undesired rolling or tilting motion of the driver's cab can be actively controlled or prevented by using the actuators.

15 Claims, 3 Drawing Sheets

U.S. PATENT DOCUMENTS

| | | | |
|---|---|---|---|
| 6,758,294 B2 * | 7/2004 | Peddycord et al. | 180/89.12 |
| 7,695,054 B2 | 4/2010 | Haeusler et al. | |
| 7,950,727 B2 * | 5/2011 | Haeusler et al. | 296/190.07 |
| 7,997,600 B2 * | 8/2011 | Haller et al. | 280/124.157 |
| 8,177,245 B2 * | 5/2012 | Bitz et al. | 280/124.128 |
| 2005/0274557 A1 | 12/2005 | Barta et al. | |
| 2007/0056787 A1 * | 3/2007 | Haeusler et al. | 180/89.13 |
| 2007/0267894 A1 * | 11/2007 | Van Den Brink et al. | 296/190.07 |
| 2011/0031712 A1 * | 2/2011 | Bitz et al. | 280/124.106 |
| 2011/0095569 A1 * | 4/2011 | Haeusler et al. | 296/190.07 |

FOREIGN PATENT DOCUMENTS

| | | |
|---|---|---|
| DE | 101 30 636 A1 | 1/2003 |
| DE | 10 2005 043 998 A1 | 4/2007 |
| EP | 0190978 A1 * | 8/1986 |
| WO | 2008/009286 A1 | 1/2008 |

\* cited by examiner

SUSPENSION DEVICE HAVING ANTI-ROLL COMPENSATION

This application is a National Stage completion of PCT/DE2009/050074 filed Dec. 17, 2009, which claims priority from German patent application serial no. 10 2008 063 812.9 filed Dec. 19, 2008.

FIELD OF THE INVENTION

The invention relates to a suspension device for the resilient and impact-damping suspension of a mass, such as a truck driver's.

BACKGROUND OF THE INVENTION

Suspension devices of the initially described type can be used, for example, although certainly not exclusively, in trucks, agricultural vehicles, or heavy-duty vehicles to decouple the driver's cab from the vehicle chassis, with respect to vibrations and motions, to the greatest extent possible.

Since high spring and damping rates must be selected for the spring/damper units of the chassis in heavy-duty vehicles due to considerable vehicle weights and large unsprung masses in the chassis, road irregularities or vibrations originating in axles and the drive train are still often transferred, to a considerable extent, via the axle suspension to the chassis and, from there, to the driver's cab.

In order to minimize the transfer of such impacts and vibrations to the driver's cab and thereby improve ergonomics and the driver's occupational safety, driver's cab suspensions have been developed in which the driver's cab is supported by a separate suspension system on the vehicle chassis. Such suspension systems for the driver's cab can be designed with lower spring rates than the axle suspension since the mass of the driver's cab is much less than that of the vehicle, and therefore road irregularities and/or vibrations originating in the drive train or axles of the vehicle can be much better isolated from the driver's working space due to such relatively soft cab suspension systems.

In the case of elastic cab suspension devices of the type in question, in order to limit undesired lateral motions or rolling of the driver's cab relative to the vehicle chassis—which occur, for instance, when driving on an incline or around a corner, or driving over irregularities present on only one side of the road—suspension devices have been developed in which a Watt's linkage system is disposed between the driver's cab and the chassis. Depending on the embodiment thereof, the Watt's linkage system prevents the driver's cab from moving laterally relative to the chassis, and ensures that spring compression movements of the cab relative to the chassis are substantially linear, i.e. the Watt's linkage system reduces the degrees of freedom of movement between the cab and the chassis to a vertical spring compression movement in particular.

Such a suspension device is known from DE 10 2005 043 998 A1, for example. Depending on the embodiment, this known suspension device comprises one or more Watt's linkages which reduce the degrees of freedom of movement of the cab relative to the chassis of a truck, for example, to a vertical motion only, and/or prevent rolling motions of the cab relative to the chassis. At the same time, linear spring compression movements between the cab and the chassis along the vertical axis can continue unrestricted, within the limits of cab spring displacement.

The coupling utilized in this known suspension device, which is largely fixed with respect to rolling motions between the cab and the chassis, offers the advantage in particular that independent rolling motions of the cab relative to the chassis can be prevented. However, this also causes the driver's cab to inevitably follow every roll-inducing motion coming from the chassis. When that occurs, the roll angle of the driver's cab is at least as great as the angle of the roll-inducing motion coming from the chassis, although it is often even greater, due to elasticities in the driver's cab mounting and the Watt's linkages.

Cornering or driving on an incline, or over irregularities present on only one side of the road, can cause the driver's cab to tilt to the same extent as the vehicle chassis, or even more. For reasons of comfort and safety, it would be desirable to prevent or at least reduce lateral inclinations of the driver's cab under all driving conditions. Furthermore, the driver's comfort would be greatly enhanced if the transfer of the inclination of the chassis to the driver's cab could be prevented or reduced e.g. when a truck is parked transversely to an incline.

SUMMARY OF THE INVENTION

Proceeding from this background, the problem addressed by the present invention is that of creating a suspension device for resiliently suspending a mass relative to a substructure, in particular for suspending a driver's cab in a truck, with which the stated disadvantages of the prior art can be overcome. In particular, the suspension device should prevent or compensate for undesired rolling motions of the mass or driver's cab, including roll-inducing motions or tilted positions of the substructure or chassis.

The suspension device according to the invention is used primarily, in a manner known per se, to resiliently suspend a mass relative to a substructure, i.e. to suspend the driver's cab of a truck relative to the vehicle chassis, for example.

In a manner that is likewise known per se, the suspension device comprises a spring/damper arrangement, which is disposed between the mass and the substructure and dampens impacts and/or vibrations, and a Watt's linkage system comprising at least one Watt's linkage which connects the mass and the substructure in a relatively displaceable manner. The at least one Watt's linkage is used to reduce the degrees of freedom of movement of the mass relative to the substructure, such as the substantially linear guidance of the mass or cab along the (vertical) main impact direction of the substructure or chassis.

According to the invention, the suspension device is characterized in that at least one of the pivot points of the Watt's linkage is connected to the mass and/or the substructure in a relatively displaceable manner. The relative position between the pivot point of the Watt's linkage and the mass can be adjusted by using at least one substantially linearly acting actuator.

Given that, according to the invention, the relative position between the pivot point of the Watt's linkage and the mass or the substructure can be changed, it is possible to counteract—actively, in particular—undesired rolling of the mass relative to the substructure—that is, undesired lateral inclinations of the driver's cab of a truck, for example—by shifting the pivot point of the Watt's linkage relative to the connection to the mass and/or the substructure using the actuator.

In other words, the roll angle between the mass and the substructure, i.e. between the driver's cab and the chassis of a truck, for example, can be changed in this manner, actively in particular, in order to maintain the horizontal positioning of the driver's cab even if the chassis tilts laterally, or to at least ensure that the lateral inclination of the driver's cab is less than that of the chassis.

The invention can be implemented regardless of how the actuator is designed and connected to the at least one Watt's linkage, provided a change in length of the actuator results in a change in the roll angle of the mass or the cab relative to the substructure.

According to a preferred embodiment of the invention, the at least one actuator is connected to the at least one pivot point of the Watt's linkage using a moment arm which is disposed substantially perpendicularly to the acting direction of the actuator. The acting direction of the actuator preferably extends substantially perpendicularly to the straight-line direction of the at least one Watt's linkage.

Thus, depending on the length of the moment arm, a torque can be generated between the pivot point of the Watt's linkage, on which the actuator acts, and the mass or cab. By way of this torque, which is applied by the actuator, undesired rolling motions of the cab can be countered, actively in particular.

This embodiment can also be used to prevent roll, for example, when the Watt's linkage system of the suspension device comprises only one Watt's linkage instead of a plurality thereof. In that particular case, the single Watt's linkage is used in particular to prevent lateral (translatory) motions of the mass or cab relative to the substructure. The actuator, which is connected via a lever arm, can be used in this case to actively prevent roll and guide the mass or cab approximately parallel to the direction of motion of the resilient suspension.

According to a further preferred embodiment of the invention, at least one pivot point of the Watt's linkage system is connected elastically to the mass or the substructure. The at least one actuator is disposed between the pivot point and the mass, or between the pivot point and the substructure, relative to the effective change in length thereof. In other words, the position of the pivot point between the Watt's linkage and the mass, or the position of the pivot point between the Watt's linkage and the substructure can be adjusted by changing the length of the actuator, in that the elastic connection of the pivot point—which can be an elastomeric bearing in particular—is deformed by the actuator.

This embodiment also results in emergency-operation properties of the suspension device that apply if the actuator should fail. In such a case, the elastic connection of the pivot point, which can be adjusted using the actuator and via which the Watt's linkage is connected to the cab or the substructure, automatically returns to the center position due to the spring forces thereof.

According to a further preferred embodiment of the invention, the elastic connection between the pivot point of the Watt's linkage, which is connected to the actuator, and the mass or the substructure has different spring constants in at least two different spatial directions. As a result, mutually independent, different spring rates can be established for different functions of the Watt's linkage and/or for different directions of motion of the mass or the driver's cab. For instance, the spring rate of the elastic connection in the vertical direction can determine the stiffness of the Watt's linkage relative to the rolling motions of the mass or driver's cab, while the different spring rate of the elastic connection in the horizontal direction determines the stiffness of the Watt's linkage relative to lateral motions of the mass or driver's cab.

According to a further, preferred embodiment of the invention, the suspension device is characterized in that the Watt's linkage system comprises two Watt's linkages. In that case, the straight-line directions of the at least two Watt's linkages are the same, the Watt's linkages are interspaced along the common straight-line direction, and the planes of motion of the Watt's linkages extend parallel to one another.

This embodiment, which comprises at least two interspaced Watt's linkages, has the advantage that, in addition to ensuring that the mass travels along a straight line, which can be can attained by using a single Watt's linkage, rolling motions of the mass or cab relative to the chassis can be effectively suppressed without any further auxiliary means. This is possible because interspaced Watt's linkages can transfer or divert not only transverse forces (which a single Watt's linkage can do) between the substructure and the mass, but also torques, in particular rolling moments, due to the distance between the Watt's linkages, which functions as a moment arm.

Proceeding from this background, according to a further, particularly preferred embodiment of the invention, the outer pivot points associated with the lateral thrust struts of the two Watt's linkages are located in pairs on a pivot axis common to the two Watt's linkages. The lateral thrust struts of different Watt's linkages are provided in pairs, as a single piece in the form of a V-shaped combination strut, for example. As a result, the outer pivot points of the lateral thrust struts of the two Watt's linkages share a total of only two joint axes, instead of requiring four joint axes, as is the case when two separate Watt's linkages are used.

Furthermore, this embodiment—in which two commonly articulated lateral thrust struts therefore form one V-shaped component which is similar to an A-frame arm—enables the design to be simplified, in particular, since the number of components required, in particular the number of joint connections required, is greatly reduced. This is possible because it is no longer necessary to provide four swivel bearings—as is the case when using two Watt's linkages that have separately supported lateral thrust struts—but rather only two swivel bearings for connecting the outer pivot points of all four lateral thrust struts of the two Watt's linkages. As a result, fewer components are required and, therefore, costs are reduced. Furthermore, the Watt's linkage system is therefore particularly compact and space-saving, and now only two connecting points are required on the frame, instead of four.

Since, in this embodiment, the forces that are generated by the two Watt's control arms and act on the connecting points on the frame are cancelled out, in part, due to vectorial addition, the connecting parts on the frame can be made more lightweight and inexpensive than is the case with two Watt's linkages comprising separately articulated lateral thrust struts. Furthermore, when elastomeric bearings are used, elastomeric bearings with reduced stiffness can be used, thereby improving sound insulation. Finally, all lateral thrust struts of the two Watt's linkages can therefore be easily disposed in the same plane of motion, thereby saving even more construction space.

According to a further embodiment of the invention, two different pivot points of a Watt's linkage system composed of at least two Watt's linkages are connected to the mass and the substructure such that they are displaceable relative to one another using two actuators. The use of two actuators that act at different pivot points of the Watt's linkage system results in greater adjustment travel in particular, due to the resulting series arrangement and addition of the operating travel of the two actuators, without the need to provide longer actuators or greater adjustment travel. Furthermore, it is hereby possible to attain symmetrical compensation of the rolling motions about a longitudinal axis located in the middle plane of the driver's cab.

According to an alternative embodiment of the invention, the pivot point of the at least one actuator on the Watt's linkage system is connected to the rotation point of one of the Watt's control arms of the Watt's linkage system. The acting direction of the at least one actuator thereby simultaneously extends substantially perpendicularly to the straight-line direction of the Watt's linkage system.

This embodiment results in a particularly space-saving configuration, combined with good lever action of the actuator, and, therefore, relatively low forces and the possibility to design the actuator with economical dimensions. This is possible due to the considerable distance between the two Watt's control arms of the Watt's linkage system, which form the moment arm in this embodiment for the torque generated by the actuator, as the complementary pole to an external rolling moment.

Furthermore, compared to embodiments in which actuators act on the bearing points of the lateral thrust struts in pairs, this embodiment has the advantage—since the actuator acts directly on one of the Watt's control arms of the Watt's linkage system (and, therefore, in the center of the Watt's linkage system, relative to the acting direction thereof)—that the actuator-controlled change in rolling angle thereby takes place directly about the rotation point of the other Watt's control arm, which likewise lies in the center of the Watt's linkage system. As a result, there is no need for a second actuator which is required for the embodiments described above, provided the desired change in roll angle should also take place about a central axis of the mass, or driver's cab in that case.

The disposition of the acting direction of the actuator substantially perpendicular to the straight-line direction of the Watt's linkage system furthermore results in optimal decoupling of the straight-line motion of the Watt's linkage—e.g. the vertical guidance of a truck driver's cab—from the influence on rolling motions of the driver's cab by the actuator which acts substantially in the horizontal direction in this case.

Proceeding from this background, according to a further embodiment of the invention, only one actuator is provided, wherein the pivot point of the actuator on the Watt's linkage system is connected to the rotation point of the Watt's control arm of the Watt's linkage system that is further away from the mass. Thus, the distance between the center of gravity of the mass or driver's cab and the center of rotation—which is formed by the rotation point of the respective other of the two Watt's control arms—is minimized, thereby also minimizing the undesired—in the case of a driver's cab in particular—lateral motions that occur when the roll angle is changed using the actuator.

According to a further embodiment of the invention, a spring element is connected in parallel with the actuator. Therefore, if the actuator should fail, residual stiffness of roll stabilization is retained, in that the spring element holds an actuator, which may have failed, in the middle position thereof, and returns it to that point if deflections (rolling motions) occur.

The invention can be implemented regardless of the type of actuator used and the design thereof, provided the forces required for roll stabilization can be applied by the actuator. Proceeding from this background, according to a further embodiment of the invention, the actuator is designed as a passive, semi-active, or active actuator. In the simplest form, the passive actuator can designed as a spring element, for example, a semi-active actuator can be formed by a hydraulic damper or a gas-filled spring device, and an active actuator can be present in the form of a hydraulic, pneumatic, or electric linear actuator, for example.

Proceeding from this background, and using this embodiment of the invention, it is also possible, for instance, to retrofit the suspension device according to the invention from a passive system to a semi-active or active system, simply by replacing the actuator and, if applicable, the associated control.

BRIEF DESCRIPTION OF THE DRAWINGS

The invention is explained below in greater detail with reference to drawings that merely depict examples of embodiments. In the drawings.

DETAILED DESCRIPTION OF THE PREFERRED EMBODIMENTS

Figure 1:
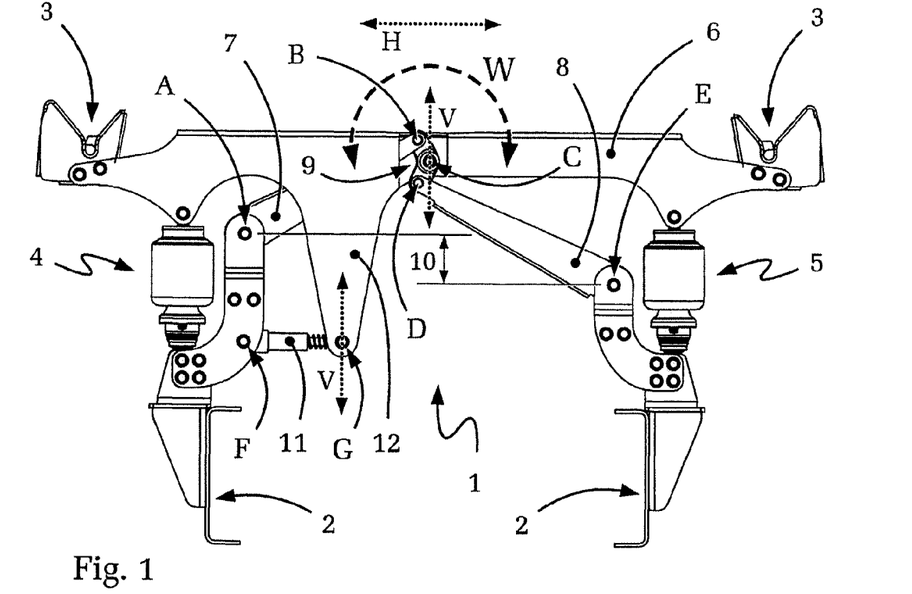
FIG. 1 shows, in a schematic depiction, an embodiment of a suspension device comprising a Watt's linkage and an actuator according to the present invention.

FIG. 1 shows, in a schematic depiction, one embodiment of a suspension device 1 according to the present invention. The suspension device 1 is used to support a truck driver's cab (not depicted) in the region of the rear end of the driver's cab, relative to the chassis 2 of the truck indicated schematically in FIG. 1. The suspension device 1 according to FIG. 1 is equipped with two mounting points 3 for mounting and supporting the driver's cab.

FIG. 1 also shows that the suspension device 1 disposed between the driver's cab and the chassis 2 comprises two spring/damper devices 4, 5 and a Watt's linkage having five joints labeled with the letters A, B, C, D, E. Of the joints A to E, in the case of the embodiment shown, A and E are attached to the chassis, while C is attached to the driver's cab or is connected to the upper cross-bridge 6 of the suspension device 1. The pivot points A to E of the Watt's linkage are interconnected by an arrangement composed of two lateral thrust struts 7, 8 and a central Watt's control arm 9.

Due to the special kinematics—which are known per se—of the Watt's linkage A, B, C, D, E according to FIG. 1, lateral transverse motions H of the driver's cab—and/or the upper cross-bridge 6 of the suspension device 1, which is connected to the driver's cab—relative to the chassis 2 are absorbed via pivot points C, A and E of the Watt's linkage and are thereby prevented. Since the particular Watt's control arm 9 can move freely in the vertical direction, the vertical motion V between the driver's cab and the chassis 2 remains fully unrestricted, however, and is merely absorbed or intercepted by the spring/damper arrangements 4, 5.

Static or dynamic transverse forces that occur are therefore transferred and diverted between the driver's cab and the chassis 2 directly via the lateral thrust struts 7 and 8, via the Watt's control arm 9, and via the joints A to E, thereby eliminating the need for lateral guidance or support of the driver's cab in addition to the Watt's linkage, at least in the region of the Watt's linkage, i.e. in the rear region of the driver's cab in the case of the present invention.

The reason for this is that the central rotation point C of the Watt's control arm 9 is unable to leave the vertical trajectory thereof, which is indicated by the dotted double arrow V in FIG. 1, due to the guidance thereof by the two lateral thrust struts 7 and 8 associated with the Watt's control arm 9 and which must have the same length for this purpose, and the outer pivot points A and E of which must be separated by a vertical distance 10 that corresponds to the vertical dimension of the Watt's control arm 9. As a result, the upper cross-bridge 6 or driver's cab and the chassis 2 are always held in the position shown, in which they are centered one above the other. A relative transverse motion of the driver's cab relative to the chassis 2 is therefore prevented by the Watt's linkage A, B, C, D, E.

Furthermore, FIG. 1 shows an actuator 11 which is connected via a lever arm 12 to the upper cross-bridge 6 of the suspension device, which is connected to the driver's cab,— and, therefore, also to the pivot point C of the central Watt's control arm 9 of the Watt's linkage—, wherein the acting direction (which is horizontal in this case) of the actuator 11 extends perpendicularly to the straight-line direction V of the Watt's linkage.

Due to this disposition, the actuator 11 performs a dual function in this embodiment. Firstly, the actuator 11, which is connected at F, G, and the suspension points A, C of the Watt's linkage form an approximate parallelogram A, C, G, F, thereby resulting in an approximately parallel guidance of the upper cross-bridge 6 of the suspension device 1, which is connected to the driver's cab, along the vertical direction of motion V. Thus, approximate anti-roll stabilization of the upper cross-bridge 6 and the driver's cab with respect to undesired rolling motions W about the longitudinal axis C of the vehicle is attained.

Secondly, the actuator 11, which is thusly disposed, may also be used for the active stabilization or compensation of unwanted rolling motions W in that—when undesired rolling motions W are detected by a suitable sensor and control circuit—the length of the actuator 11 is actively changed such that the rolling motions W are counteracted, or the rolling motions W are compensated for.

The static roll angle of the driver's cab can also be actively influenced in this manner. When a truck is parked transversely to an incline, for example, the driver's cab thereof can thus be actively tilted about the vehicle longitudinal axis C by a certain angular amount W, opposite to the direction of the incline, to thereby improve the driver's comfort.

Figure 2:
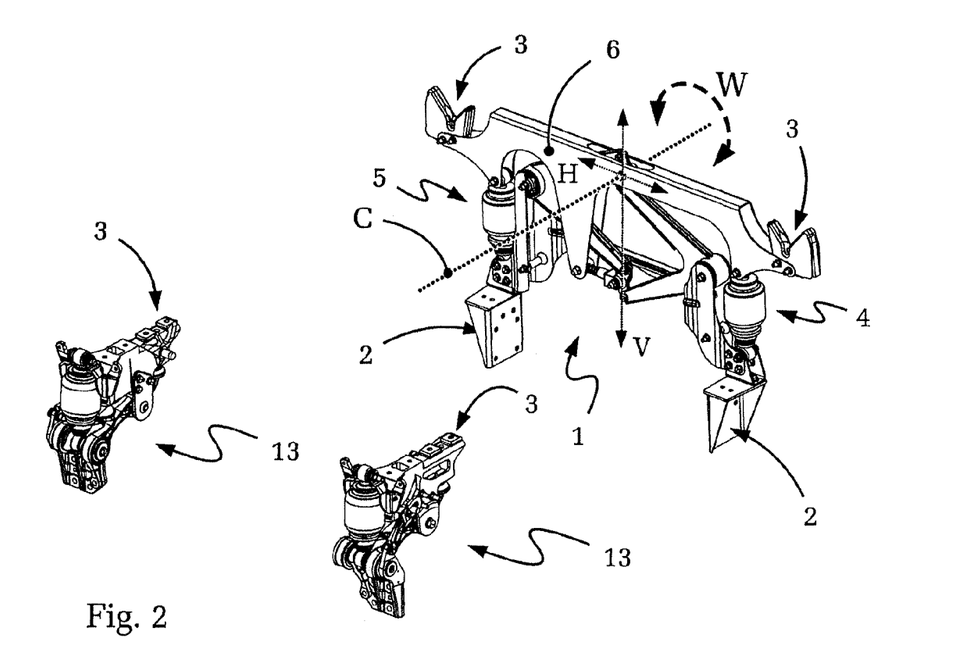
FIG. 2 shows, in an isometric depiction, an installation example of an embodiment of a suspension device according to the invention.

FIG. 2 is an isometric depiction of one possible installation situation for a suspension device 1 according to the invention. Clearly shown is one embodiment of the suspension device 1 according to the present invention, which, similar to the embodiment according to FIG. 1, is disposed in the region of the rear end of a driver's cab (not depicted) of a truck, and is connected to the chassis of the truck using appropriate fittings 2.

The front of the driver's cab is connected to the chassis in a manner known per se using sprung double joints 13 comprising two additional bearing points 3 for the driver's cab. In the embodiment depicted in FIG. 2, the suspension device 1 itself is in the form of a combination of two Watt's linkages, and therefore corresponds substantially to the embodiment shown in FIG. 5.

The suspension device 1 according to FIG. 2 comprising two coupled Watt's linkages therefore ensures that only vertical spring compression movements V are possible in the rear, particularly softly suspended region of the driver's cab; and ensures that undesired rolling motions W about a longitudinal axis C of the driver's cab are prevented.

Figures 3, 4:
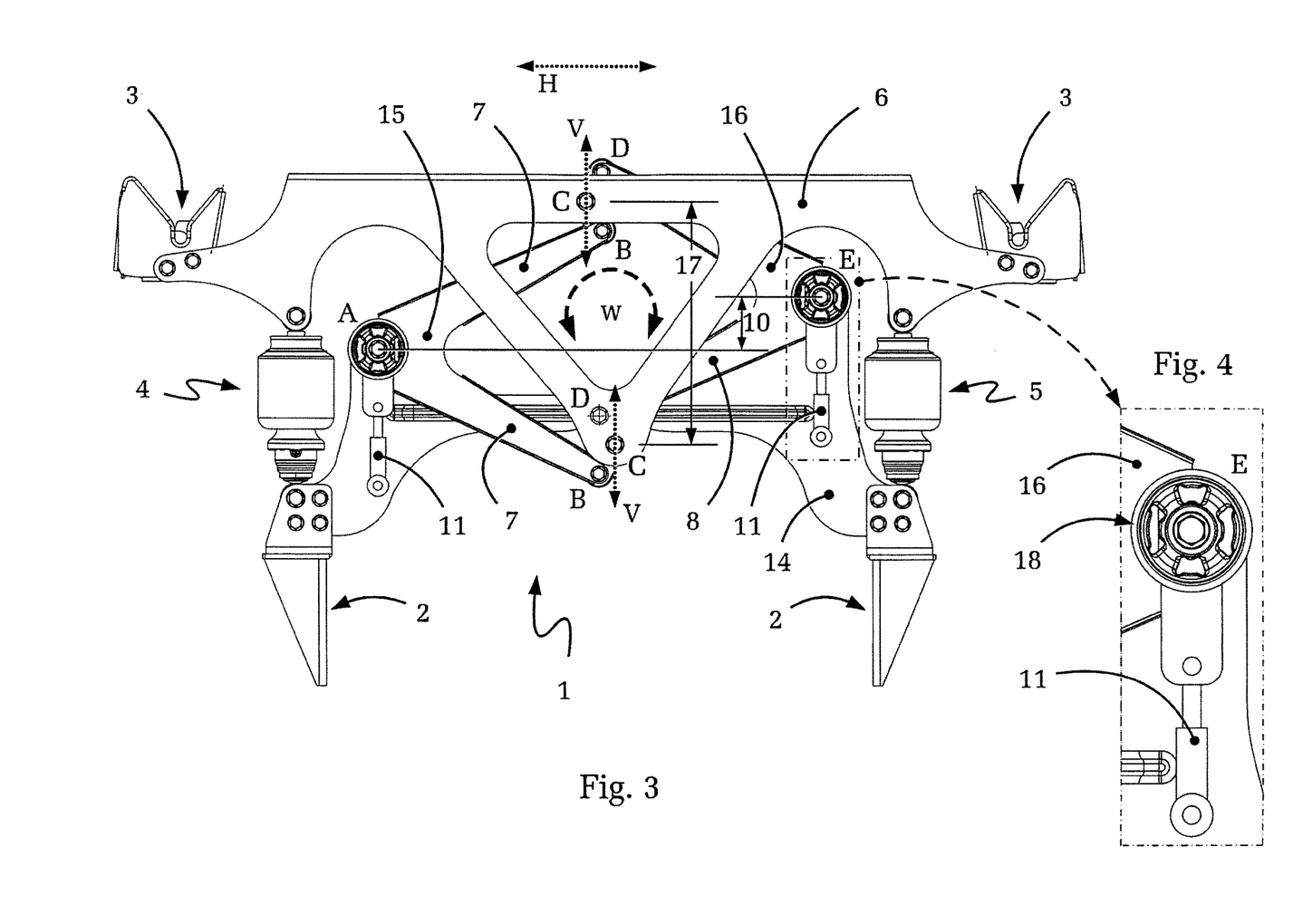
FIG. 3 shows, in a depiction and view that correspond to FIG. 1, an embodiment of a suspension device according to the invention comprising two actuators.
FIG. 4 shows, in an enlarged sectional depiction, the connection of one of the actuators in the suspension device according to FIG. 3.

FIG. 3 shows, in a view that corresponds to that of FIG. 1, a further embodiment of a suspension device according to the invention, in which two Watt's linkages A, B, C, D, E are present, wherein the two Watt's linkages A, B, C, D, E are disposed vertically one above the other in this case. The outer pivot points A, E associated with lateral thrust struts 7, 8 of the two Watt's linkages A, B, C, D, E are disposed in pairs on a pivot axis at A and E, respectively, which is common to the two Watt's linkages on a lower cross-bridge 14 of the suspension device 1. In addition, two lateral thrust struts 7, 8 of various Watt's linkages A, B, C, D, E are designed, in pairs in each case, as a one-piece component in the form of a combination strut 15 and 16, respectively.

This embodiment, in which the lateral thrust struts having a common pivot point at A, E thus form a V-shaped component in each case which is similar to an A-frame arm 15, 16, is simplified considerably in terms of design, in particular, compared to a suspension device having two separate Watt's linkages, due to the elimination of some of the bearing points that are required in that case. The minor kinematic loads which occur in the one-piece combination struts 15, 16 in this embodiment when spring compression movements take place can be intercepted easily by way of a slight elastic deformation of the V-shaped combination struts 15, 16.

Compared to embodiments having only one Watt's linkage (see FIG. 1, for example), Watt's linkage systems comprising two vertically interspaced Watt's linkages have the advantage in particular that straight-line motion of the upper cross-bridge 6 (or the driver's cab) relative to the chassis 2 can therefore be attained along the vertical line V, and that stabilization with respect to rotational motions—i.e. with respect to undesired rolling motions W—can also be attained directly in this manner.

This is possible because the two Watt's linkages A, B, C, D, E, which are disposed such that a vertical distance 17 exists between the chassis 1 and the driver's cab 3 in each case, as shown in FIG. 3, can transfer transverse forces along the horizontal line H, as is the case with a single Watt's linkage; see the embodiment according to FIG. 1, for example. Additionally, since the vertical distance 17 between the two Watt's linkages acts as a moment arm, it is possible to thereby transfer torques which act about the longitudinal axis of the vehicle and are thus rolling moments W as shown in FIGS. 1 to 3.

In other words, the driver's cab in the embodiment shown in FIG. 3 can undergo only vertical compensation motions—which are desired—relative to the chassis 2 along the dotted lines V, but lateral relative motions H such as rotations W of the driver's cab relative to the chassis 2 are prevented due to the dual Watt's linkage system shown.

As described initially, this causes the chassis 2 and the driver's cab to be coupled to one another in a largely rigid manner with respect to the rolling moments or rolling motions W, and therefore if the chassis 2 should become tilted, this tilt is also transferred—which may be undesirable—to the upper cross-bridge 6 and therefore to the driver's cab. This applies in the dynamic case, e.g. during travel, and in the static case, e.g. when the vehicle is parked transversely to an incline.

The embodiment shown in FIG. 3 also differs from the embodiment shown in FIG. 1 in that two actuators 11 instead of one are present in the embodiment according to FIG. 3, each of which acts on an elastomeric joint A or E of the suspension device. The action of the particular actuators 11 on the elastomeric joint A or E is shown in an enlarged depiction in FIG. 4. The actuators 11 are therefore connected in an articulated manner to the suspension device 1 at both ends, wherein the lower—as shown in the drawing—end of the particular actuator 11 is connected to the lower cross-bridge 14 of the suspension device 1, while the upper end of the particular actuator 11 is coupled to the part of the elastomeric joint A or E of the particular combination strut 15, 16, respectively (at the outer joint sleeve 18 in this case), that is connected to the combination strut 15, 16 associated with the joint.

Since the elastic pivot points A and E of the two V-shaped combination struts 15, 16 can be adjusted in this manner using actuators, it is therefore possible—in the embodiment according to FIG. 3 as well—for the driver's cab to remain in a horizontal position even if the chassis 2 is tilted. This is possible since, when a tilted position of the chassis 2 is sensed, it is possible to ensure—by controlling the two actuators 11 accordingly and thereby rotating the entire Watt's linkage system—that the central pivot points C of the two Watt's control arms B-C-D are displaced horizontally relative to one another such that the upper cross-bridge 6 of the suspension device 1—and therefore the driver's cab as well—retains the horizontal position.

In the embodiment shown in FIGS. 3 and 4, the elastomeric bearings A and E—via which the two V-shaped combination struts 15, 16 of the two Watt's linkages are connected to the lower cross-bridge 14—also have two different spring stiffnesses. A first spring stiffness along the horizontal line H decouples the driver's cab from the vehicle chassis with respect to horizontal vibrations, while a second spring stiffness—which is largely independent of the first spring stiffness—of the two elastomeric bearings A and E along the vertical line V ensures that the actuators 11 are provided with sufficient travel to control the horizontal position of the driver's cab.

At the same time, the spring stiffness of the elastomeric bearings A and E along the vertical line V—in the sense of residual spring stiffness—performs an emergency-operation function if the actuators 11 or the control thereof should fail. In such a case, an uncontrollable tilted position of the cab or complete failure of roll stabilization are therefore prevented, and instead the upper cross-bridge 6 and, therefore, the driver's cab are stabilized parallel to the chassis by the residual vertical restoring forces of the elastomeric bearings A and E.

Figures 5, 6:
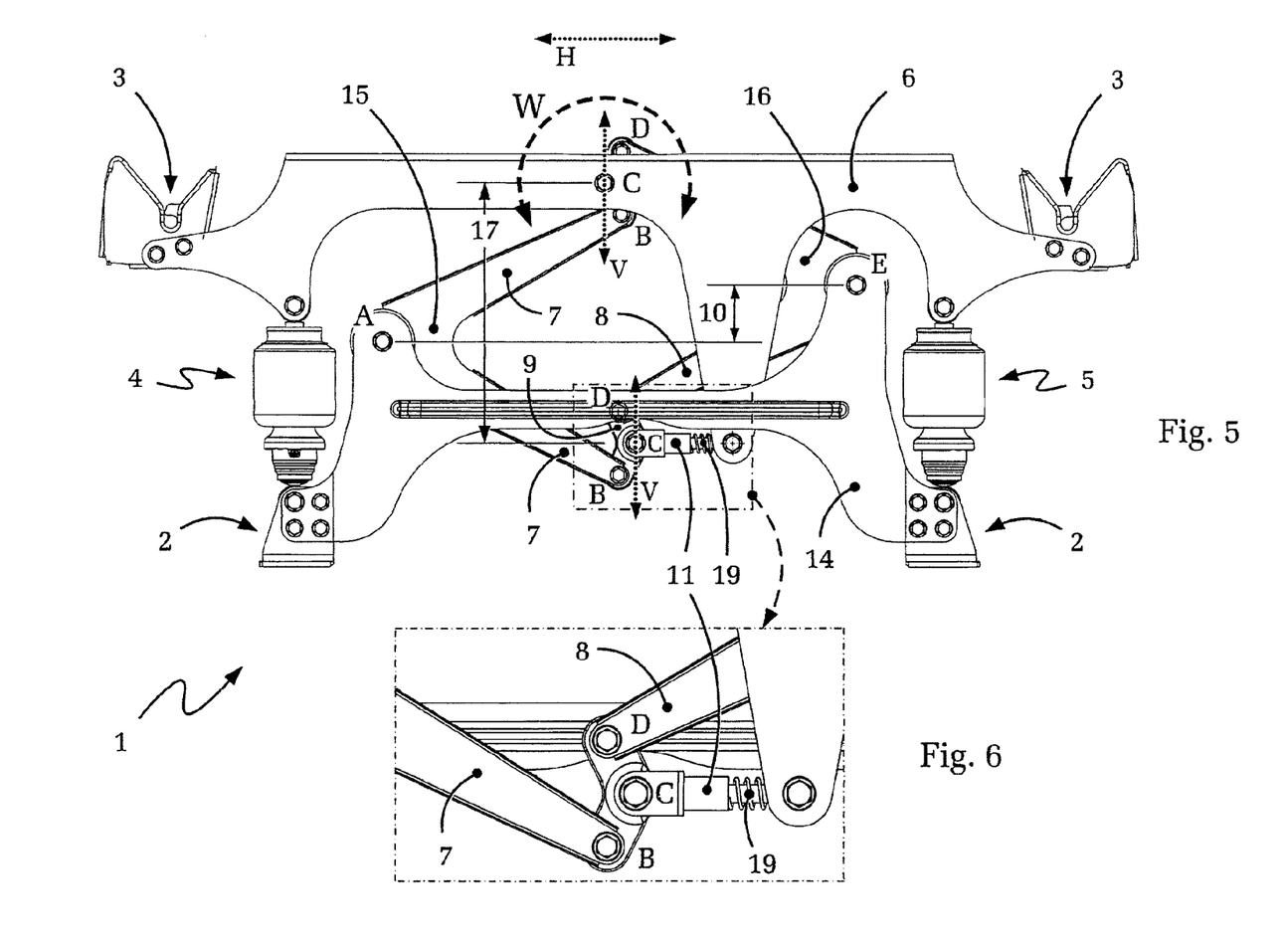
FIG. 5 shows, in a depiction and view that correspond to FIGS. 1 and 3, an embodiment of a suspension device according to the invention with the actuator acting on the Watt's control arm.
FIG. 6 shows, in an enlarged sectional depiction, the connection of the actuator to the Watt's control arm in the suspension device according to FIG. 5.

FIG. 5 shows a further embodiment of a suspension device 1 according to the invention comprising two Watt's linkages A, B, C, D, E. The suspension device 1 according to FIG. 5 differs from the suspension device according to FIG. 3, which has a similar design, in particular in that only one actuator 11 is provided, and in terms of the disposition and positioning of the actuator 11.

As is the case with the suspension device according to FIG. 3, the suspension device according to FIG. 5 comprises a configuration of two Watt's linkages A, B, C, D, E, wherein the lateral thrust struts 7, 8 of the two Watt's linkages A, B, C, D, E are again formed, in pairs, as a one-piece component in the form of V-shaped combination struts 15, 16.

In contrast to the suspension device according to FIG. 3, only one actuator 11 is present in this case, which also does not act on one of the suspension points A to E of the V-shaped combination struts 15, 16, but rather is assigned directly to one of the two Watt's control arms 9. In other words, in this embodiment, the rotation points C of the two Watt's control arms 9 remain in a plumb position above one another at all times relative to the lower cross-bridge 14 of the suspension device 1, and thus directly follow any rolling motions W of the chassis 2.

In this embodiment of the invention, the damping or active compensation of the rolling motions W is therefore attained by the upper cross-bridge 6 of the suspension device 1 being swiveled by the actuator 11 relative to the rotation point of one of the two Watt's control arms. In the embodiment shown in FIG. 5, this swiveling or anti-roll compensation—with rotation point C of the upper of the two Watt's control arms as the center of rotation-takes place by the actuator 11 being assigned and connected to the lower of the two Watt's control arms 9.

This is advantageous since—compared to the embodiment depicted in FIG. 3 in particular—only a single actuator 11 is required to swivel the upper cross-bridge 6 or the driver's cab about a central axis C lying in the symmetry plane thereof. Furthermore, it is therefore possible to move the rotation point C—about which the upper cross-bridge 6 or the driver's cab is swiveled in this embodiment—as close as possible to the center of gravity of the cab. The lateral motions of the center of gravity of the driver's cab, which are caused by anti-roll compensation, are therefore minimized. The rotation point C of the upper cross-bridge 6 can also be placed on the lower of the two Watt's control arms 9, and the actuator 11 can be assigned to the upper Watt's control arm, if this should become necessary for structural reasons.

Furthermore, in the embodiment according to FIG. 5, it is no longer necessary to expressly provide a relatively high elasticity of the connecting points A, E of the combination struts 15, 16 on the lower cross-bridge 14 in order to ensure a degree of freedom of movement of the combination struts 15, 16 in the vertical direction V, which is required for anti-roll compensation in the case of the embodiment depicted in FIG. 3.

Instead, the embodiment shown in FIGS. 5 and 6 also makes it possible to design the connection of the combination struts 15, 16, with the lower cross-bridge 14 thereof, to be very stiff at the connection points A, E thereof, at least with respect to the vertical connection. As a result, the control capability with respect to undesired rolling motions W using the actuator 11 is improved, since this enables secondary oscillation effects resulting from elasticities in the Watt's linkage connection to be minimized or eliminated, in the vertical connection at pivot points A and E in particular. The robustness and service life of elastomeric bearings A and E, with which the combination struts 15, 16 are connected to the lower cross-bridge 14, are also increased as a result.

Regardless thereof, the stiffness of the lateral guidance of the suspension device 1 can still be adjusted as desired and in a variable manner in that the elastomeric bearings A and E of the V-shaped combination struts 15, 16 maintain, at the connection points thereof with lower cross-bridge 14, appropriate resilience or spring constants along the horizontal line H, while the independent spring constants of the elastomeric bearings A and E along the vertical line V can be selected with the usual stiffness. The rolling behavior and the lateral resilience can also be adjusted according to the application and the customer's requirement by selecting appropriate elastomeric bearings A and E having appropriate and, possibly, different spring stiffnesses in the horizontal direction H and in the vertical direction V.

In order to attain the desired emergency-operation property or residual stiffness of roll stabilization in the embodiment shown in FIG. 5 as well, a spring element 19 is connected in parallel to the actuator 11, similar to the embodiment described with reference to FIG. 1.

This is also shown in particular in the enlarged sectional depiction in FIG. 6. The spring element 19 ensures that the actuator 11 is returned to the central position thereof from any position if failure should occur, thereby ensuring that a relative roll angle W—which has basically been halted—between the upper 6 and lower cross-bridge 14 or between the cab and the chassis 2 is returned to zero or is reduced.

In contrast to the embodiment shown in FIG. 1, it is not required in the embodiment shown in FIG. 5 to re-adjust the actuator 11 to ensure that spring compression of the driver's cab occurs in parallel. Instead, in the embodiment depicted in FIG. 5, active control of the actuator 11 is required only when the intention is to actually change the relative roll angle W between the cab and the chassis 2.

Due to the long effective moment arm 17 with which the actuator 11 acts on the upper cross-bridge 6, advantageous force transfer also results, with the capability to obtain a compact and economical design with respect to the actuator cross-section. In addition, the actuator 11 in this embodiment is disposed such that it is well protected, and does not require any notable additional construction space compared to an embodiment without active roll stabilization.

It is also possible to retrofit the embodiment according to FIG. 5 in particular—between a passive system, a semi-active system, or a system having active anti-roll compensation—at any time by providing a single spring element at the point of the actuator 11 (passive system), by using a shock absorber or a gas-filled spring device (semi-active system), or by providing an actively controlled, e.g. hydraulic actuator 11 as described above (active anti-roll compensation).

In summary, it is therefore clear that the invention provides a suspension device for the resilient suspension of a mass, such as a truck driver's cab, with which the desired, in particular vertical, degree of freedom of movement of the driver's cab can be defined in a manner that saves construction space and operates reliably. At the same time, undesired rolling motions or a tilt of the mass or driver's cab, including roll-inducing motions coming from the substructure or chassis, can be actively prevented by using actuators.

The invention therefore enables roll to be suppressed—thereby improving the driver's comfort—actively and in a structurally simple manner, in particular when the invention is utilized in truck driver cab systems.

LIST OF REFERENCE CHARACTERS 1 suspension device
2 substructure, vehicle chassis
3 driver's cab bearing point
4, 5 spring/damper arrangement
6 upper cross-bridge
7, 8 Watt's linkage lateral thrust strut
9 Watt's control arm
10 distance
11 actuator
12 lever arm
13 double joint
14 lower cross-bridge
15, 16 combination strut
17 distance, moment arm
18 joint sleeve
19 spring element
A to G joint, pivot point
H horizontal direction of motion
V vertical direction of motion
W rolling motion, rolling moment, roll angle

The invention claimed is:

1. A suspension device (1) for resiliently suspending a mass relative to a substructure (2), the suspension device (1) comprising:
   a spring/damper arrangement (4, 5) disposed between the mass and the substructure (2) for damping at least one of impact and vibration,
   a Watt's linkage system having at least a first Watt's linkage (A, B, C, D, E) connecting the mass and the substructure (2) in a relatively displaceable manner, via a control arm (9) and first and second fixed length lateral struts (7, 8), to reduce freedom of movement of the mass relative to the substructure (2),
   a central portion of the control arm (9) being pivotally secured with one of the mass and the substructure (2),
   the first fixed length lateral strut (7) interconnecting a first end of the control arm (9) with a first pivot point (A) which is connected to the other of the substructure (2) and the mass,
   the second fixed length lateral strut (8) interconnecting a second end of the control arm (9) with a second pivot point (E) which is connected to the other of the substructure (2) and the mass, and
   at least one of a plurality of pivot points (A, B, C, D, E, G) of the at least first Watt's linkage (A, B, C, D, E) being connected to at least one substantially linearly acting actuator (11) so as to be relatively displaceable with respect to at least one of the mass and the substructure (2) such that a relative position, between the at least one of the plurality of pivot points and either the mass or the substructure (2), is adjustable by actuation of the at least one substantially linearly acting actuator (11).

2. The suspension device according to claim 1, wherein the actuator (11) is connected to the at least one of the plurality of pivot points (A, B, C, D, E, G) of the Watt's linkage via a lever arm (12) which is disposed substantially perpendicularly to an acting direction of the actuator.

3. The suspension device according to claim 2, wherein an acting direction of the actuator (11) extends substantially perpendicularly to a straight-line direction (V) of the at least one Watt's linkage (A, B, C, D, E).

4. The suspension device according to claim 1, wherein at least one of the plurality of pivot points (A, E) of the at least one Watt's linkage (A, B, C, D, E) is elastically connected to one of the mass and the substructure (1), and the at least one actuator (11) is disposed between the at least one pivot point (A, E) and one of the mass and the substructure (2).

5. The suspension device according to claim 4, wherein the elastic connection between the at least one of the plurality of pivot points (A, E) of the Watt's linkage (A, B, C, D, E) connected to the actuator (11) and either the mass or the substructure (2) has different spring constants in at least two different spatial directions (H, V).

6. The suspension device according to claim 1, wherein a spring element (19) is connected in parallel with the actuator (11).

7. The suspension device according to claim 1, wherein the at least one actuator (11) is one of a passive actuator, a semi-active actuator, and an active actuator.

8. A suspension device (1) for resiliently suspending a mass relative to a substructure (2), the suspension device (1) comprising:
- a spring/damper arrangement (4, 5) disposed between the mass and the substructure (2) for damping at least one of impact and vibration,
- a Watt's linkage system having at least first and second Watt's linkages (A, B, C, D, E) connecting the mass and the substructure (2) in a relatively displaceable manner for reducing freedom of movement of the mass relative to the substructure (2),
- at least one displaceable pivot point (A, B, C, D, E, G) of at least one of the first and the second Watt's linkages (A, B, C, D, E) being connected to at least one of the mass and the substructure (2) in a relatively displaceable manner, and
- a relative position between the at least one displaceable pivot point (A, B, C, D, E, G) of at least one of the first and the second Watt's linkages (A, B, C, D, E) and either the mass or the substructure (2) is adjustable by actuation of at least one substantially linearly acting actuator (11),
- wherein straight-line directions (V) of the at least first and second Watt's linkages (A, B, C, D, E) are the same, the at least first and second Watt's linkages (A, B, C, D, E) are interspaced along the common straight-line direction (V), and planes of motion of the at least first and second Watt's linkages (A, B, C, D, E) extend parallel to one another.

9. The suspension device according to claim 8, wherein first and second outer pivot points (A, E) associated with first and second fixed length lateral thrust struts (7, 8) of the at least first and second Watt's linkages (A, B, C, D, E) are disposed in pairs on a pivot axis (A, E) that is common to the at least the first and the second Watt's linkages (A, B, C, D, E), and are designed, in pairs, as one piece and shaped as substantially V-shaped first and second combination struts (15, 16).

10. The suspension device according to claim 8, wherein first and second pivot points (A, E), of the first and the second Watt's linkages which form the Watt's linkage system (A, B, C, D, E), are connected to one of the mass and the substructure (2) such that first and second pivot points (A, E) are displaceable relative to one another using two actuators (11).

11. The suspension device according to claim 8, wherein the first and the second Watt's linkages form the Watt's linkage system (A, B, C, D, E), and a pivot point (C) of the at least one actuator (11) on the Watt's linkage system (A, B, C, D, E) is connected to a rotation point (C) of one of the Watt's control arms (9) of the Watt's linkage system (A, B, C, D, E), and an acting direction (H) of the at least one actuator (11) extends substantially perpendicularly to the straight-line direction (V) of the Watt's linkage system (A, B, C, D, E).

12. The suspension device according to claim 11, wherein only one actuator (11) is provided, the pivot point (C) of the actuator (11) on the Watt's linkage system (A, B, C, D, E) is connected to the rotation point (C) of the control arm (9) of the Watt's linkage system (A, B, C, D, E) that is located further from the mass.

13. A vehicle cab suspension device (1) for resiliently suspending a vehicle cab relative to a substructure (2), the vehicle cab suspension device (1) comprising:
- a spring/damper arrangement (4, 5) disposed between the mass and the substructure (2) for damping at least one of impact and vibration,
- a Watt's linkage system having a first Watt's linkage (A, B, C, D, E) connecting the vehicle cab relative to the vehicle substructure (2) in a relatively displaceable manner, via a control arm (9) and first and second fixed length lateral struts (7, 8), to reduce freedom of movement of the mass relative to the substructure (2),
- a central portion of the control arm (9) being pivotally secured with one of the vehicle cab relative to the vehicle substructure (2),
- the first fixed length lateral strut (7) interconnecting a first end of the control arm (9) with a first pivot point (A) which is connected to the other of the vehicle substructure (2 and the vehicle cab;
- the second fixed length lateral strut (8) interconnecting a second end of the control arm (9) with a second pivot point (E) which is connected to the other of the vehicle substructure (2 and the vehicle cab; and
- at least one of a plurality of pivot points (A, B, C, D, E, G) of the first Watt's linkage (A, B, C, D, E) being connected to at least one substantially linearly acting actuator (11) so as to be relatively displaceable with respect to at least one of the mass and the substructure (2) such that a relative position, between the at least one of the plurality of pivot points and either the vehicle substructure (2) and the vehicle cab, is adjustable by actuation of the at least one substantially linearly acting actuator (11).

14. The vehicle cab suspension device according to claim 13, wherein the vehicle substructure is a chassis of the vehicle.

15. The vehicle cab suspension device according to claim 13, wherein the vehicle cab comprises an upper cross-bridge and at least one pivot point is supported by the upper cross-bridge.

* * * * *